United States Patent [19]

Saho et al.

[11] Patent Number: 5,426,949
[45] Date of Patent: Jun. 27, 1995

[54] VACUUM VESSEL HAVING A COOLED MEMBER

[75] Inventors: Norihide Saho, Tsuchiura; Hisanao Ogata, Shimoinayoshi; Takeo Nemoto, Chiyoda; Taisei Uede; Yasuo Yamashita, both of Hitachi, all of Japan

[73] Assignee: Hitachi, Ltd., Tokyo, Japan

[21] Appl. No.: 228,001

[22] Filed: Apr. 15, 1994

Related U.S. Application Data

[63] Continuation of Ser. No. 910,530, Jul. 8, 1992, abandoned.

[30] Foreign Application Priority Data

Jul. 15, 1991 [JP] Japan ................... 3-173597

[51] Int. Cl.⁶ ............................................. F25B 19/00
[52] U.S. Cl. ............................................ 62/51.1; 62/55.5
[58] Field of Search ............................... 62/51.1, 55.5

[56] References Cited

U.S. PATENT DOCUMENTS

| | | | |
|---|---|---|---|
| 3,256,706 | 6/1966 | Hansen . | |
| 3,262,279 | 7/1966 | Moore, Jr. | 62/55.5 |
| 3,304,729 | 2/1967 | Chandler et al. | 62/48.3 |
| 3,310,955 | 3/1967 | Sneden, Jr. et al. | 62/55.5 |
| 3,579,997 | 5/1971 | Rapinat | 62/55.5 |
| 3,579,998 | 5/1971 | Thibault et al. | 62/55.5 |
| 3,585,807 | 6/1971 | Hengevoss et al. | 62/55.5 |
| 3,769,806 | 11/1973 | Boissin et al. | 62/55.5 |
| 4,072,025 | 7/1978 | Thibault . | |
| 4,148,196 | 4/1979 | French et al. | 62/55.5 |
| 4,277,949 | 7/1981 | Longsworth | 62/51.1 |
| 4,341,079 | 7/1982 | Bonn | 62/55.5 |
| 4,531,372 | 7/1985 | Slabaugh | 62/55.5 |
| 5,083,445 | 1/1992 | Saho et al. | 62/55.5 |
| 5,187,938 | 2/1993 | Mraz et al. | 62/51.1 |
| 5,201,184 | 4/1993 | Roth | 62/51.1 |

FOREIGN PATENT DOCUMENTS

| | | |
|---|---|---|
| 0398156 | 5/1990 | European Pat. Off. . |
| 2321609 | 8/1975 | France . |
| 1816981 | 8/1969 | Germany . |
| 1034364 | 2/1986 | Japan . |
| 185690 | 8/1986 | Japan . |
| 1333836 | 8/1987 | U.S.S.R. . |

OTHER PUBLICATIONS

2168 Cryogenics 31 (1991) Mar., No. 3, Guildford, Surrey, GB "Cool-down efficiency of circulation type superconducting devices".

11th Symposium Fusion Engineering— Proceedings vol. 2, Nov. 18-22, 1985 Austin, Tex. "Cryopumps and Cryogenic Systems for JT-60 Neutral Beam Injectors" K. Shibanuma, et al.

Primary Examiner—Ronald C. Capossela
Attorney, Agent, or Firm—Antonelli, Terry, Stout & Kraus

[57] ABSTRACT

A vacuum vessel has a member to be cooled to a low operating temperature inside the vacuum vessel and a main cooling circuit having fluid for cooling the member to operating temperature. The main cooling circuit has first fluid refrigerating means located at the vacuum vessel. To achieve rapid cooling, there is a pre-cooling circuit having the fluid for pre-cooling the member towards the operating temperature. The pre-cooling circuit has second fluid refrigerating means operating independently of the first fluid refrigerating means. The pre-cooling circuit cools the main cooling circuit, prior to operation of the main cooling circuit, by passage of the fluid from the pre-cooling circuit into the main cooling circuit. A heat shield cooling circuit for cooling a heat shield cools the second fluid refrigerating means of the pre-cooling circuit.

17 Claims, 5 Drawing Sheets

VACUUM VESSEL HAVING A COOLED MEMBER

This application is a continuation of Ser. No. 07/910,530, filed Jul. 8, 1992, now abandoned.

BACKGROUND OF THE INVENTION

1. Field of The Invention

This invention relates to a vacuum vessel having a member cooled to a low temperature in use, for example, to the temperature of liquid helium, and means for cooling the cooled member. More particularly, but not exclusively, the present invention relates to a cryopump for condensing and adsorbing gas molecules on a cryopanel surface cooled to an ultra-low temperature, such as is used in a nuclear fusion reactor, etc.

2. Description of The Prior Art

The article "Cryopumps and cryogenic systems of prototype injector unit for JT-60", by T. Shibata et al., 9th International Cryogenic Engineering Conference, May 1982, describes a large scale cryogenic apparatus. A cryopump unit is used in each of a plurality of neutron beam injection devices disposed around a nuclear fusion apparatus. Each cryopump unit is cooled by liquid helium and liquid nitrogen. The cryopanel of each cryopump which is used for condensing and thus adsorbing gas molecules and exhausting them at a high speed is cooled to about 3.7K by liquid helium. A heat shield plate cooled to a low temperature of about 80K by liquid nitrogen is disposed around the cryopanel of each cryopump unit to avoid the cryopanel being directly heated by radiant heat from normal and high temperature portions outside the pump.

In known arrangements, the liquid helium that cools the cryopanel of each cryopump unit is produced collectively by a common large-sized liquid helium liquefaction refrigerator and is transferred to each cryopump unit through a heat insulated piping. Low temperature helium gas evaporating inside the cryopanel is recovered by the same large-scale liquid helium liquefaction refrigerator through another heat insulated piping. Liquid nitrogen, too, is produced collectively by a common large-sized liquid nitrogen liquefaction machine or is transferred from the same liquid nitrogen storage tank to each cryopump unit through a heat insulated piping, and the low temperature nitrogen gas evaporating inside the heat shield plate is emitted to the atmosphere.

In this known, large-sized cryopump, liquid helium is transferred from the large-scale liquid helium liquefaction refrigerator to each cryopump unit through a long heat insulated piping, and a large quantity of liquid helium evaporates inside the piping. This evaporated low temperature helium gas cannot be utilized for cooling the cryopanel, and moreover, increases the fluidization pressure loss inside the piping. Therefore, the pipe diameter of the heat insulating piping must be increased.

Heat entering the insulated piping is generally about 1 W/m, and when the length of the heat insulated piping reaches 200 m, liquid helium corresponding to heat of 200 W evaporates. Heat entering the helium at the cryopump is generally from several to some dozens of watts, so that most of the liquid helium is consumed merely for cooling the heat insulated piping.

The known large-sized cryopump thus needs a large quantity of liquid helium for cooling the heat insulated piping. For this reason, a large-sized liquid helium liquefaction apparatus having a large power consumption has been required.

If gas leaks into the vacuum region of the vacuum insulated piping, the heat insulating effect is largely destroyed and a large quantity of liquid helium inside the piping evaporates, so that the heat transfer function stops, cooling the piping from ambient temperature cannot be achieved, and the function of the cryopump often stops.

Japanese Utility Model publication no. JP-U-62-167875 discloses cryopanels cooled by a helium circuit including a liquefying refrigerator and a liquid helium tank. A heat shield or baffle of louvers protects a cryopanel from ambient temperature parts.

The prior art technique described above cools a group of cryopumps with liquid helium produced by a concentrated type large-sized liquid helium liquefaction machine and transferred through heat insulated pipings disposed in the ambient atmospheric space. It therefore involves the following problems:

(1) high electric power is necessary for cooling the cryopanels,
(2) an expensive large-sized liquid helium liquefaction apparatus is necessary,
(3) long heat insulated piping having large diameters are necessary,
(4) since the long piping must be first cooled, a long time (several days) is necessary for cooling the cryopanel,
(5) heating the cryopanel needs a long time (several days), likewise.
(6) the reliability of the cooling system is low.

SUMMARY OF THE INVENTION

A first object of the invention is to provide a vacuum vessel having refrigeration means for a member to be cooled which reduces or eliminates the need for long insulated piping and can achieve relatively rapid cooling of the member to the operating temperature. It is an object to reduce the power consumption of the cooling apparatus and another object to increase the reliability of the cooling of a cooled member or members in a vacuum chamber.

In one aspect, the invention provides a vacuum vessel having a member adapted to be cooled to a low operating temperature inside the vessel, and a main cooling circuit for fluid for cooling the member to the operating temperature, the main cooling circuit having first fluid refrigerating means. The vessel further has a pre-cooling circuit for fluid for pre-cooling said member towards the operating temperature, and the pre-cooling circuit has second fluid refrigerating means operable independently of the first fluid refrigerating means.

The first fluid refrigerating means in the main circuit, which typically can be located in or adjacent to the vacuum vessel, can avoid the need for long insulated piping from a large refrigerator, while the pre-cooling circuit can independently effect rapid pre-cooling.

It is particularly advantageous, for rapid pre-cooling, if the pre-cooling circuit is arranged to effect cooling of the main cooling circuit, prior to operation of the main cooling circuit. To this end, the main cooling circuit and the pre-cooling circuit are preferably connected, for the passage of the fluid from the pre-cooling circuit into the main cooling circuit to pre-cool the main cooling circuit.

Again, to achieve rapid pre-cooling, where the vacuum vessel has a heat shield for the cooled member, and a heat shield cooling circuit, for example, a liquid nitrogen circuit, for cooling the heat shield, it is preferable that the heat shield cooling circuit includes the second fluid refrigerating means of said pre-cooling circuit, whereby the fluid in the heat shield cooling circuit provides cooling of the fluid of the pre-cooling circuit. Thus, the cooled member can be rapidly cooled to, for example, the liquid nitrogen temperature. The second fluid refrigerating means may be a heat exchanger between the pre-cooling circuit and the heat shield cooling circuit.

In one form of the invention, the heat shield cooling circuit comprises a gaseous fluid expansion device for the fluid cooling. This circuit in this case may be a helium circuit.

For improved reliability and ease of operation, preferably at least one control valve, more preferably two or more control valves, the main cooling circuit is arranged at a location of the main cooling circuit which is at ambient temperature during operation. The same may apply to the pre-cooling circuit. The ambient temperature is approximately normal atmospheric temperature, for example, 15 C.

The cooled member may be a cryopanel for condensing Gas to be exhausted from the vacuum vessel, or may comprise a superconductor device, for example, a superconductor magnet. The invention is not limited to these applications.

To provide rapid re-heating of the cooled member, and good control of reheating, the main cooling circuit may include heating means for heating fluid in the main cooling circuit to effect the heating of the member.

In another aspect of the invention, there is provided a vacuum vessel having a member to be cooled to a low operating temperature, a main circuit for cooling the member to the operating temperature, a pre-cooling circuit for pre-cooling the member towards the operating temperature, and a heat shield for the member. A heat shield cooling circuit for cooling the heat shield has a vessel which in operation contains cooled fluid, for example, liquid nitrogen, and is located inside the vacuum vessel and surrounds a portion of the main cooling circuit and a portion of the pre-cooling circuit, so as to provide cooling thereof. This also assists pre-cooling, and can reduce power consumption. To reduce heat loss, and therefore power consumption in the main cooling circuit, another aspect of the invention provides a vacuum vessel having a member to be cooled to a low operating temperature inside the vessel, and a cooling circuit for the fluid for cooling said member to said operating temperature, said cooling circuit having fluid refrigerating means, wherein substantially all parts of the cooling circuit which are maintained at below ambient temperature during the operation are located within the vacuum vessel. This also reduces the cooling time, since the long external piping is not required to be cooled.

In the application of the invention to a vacuum vessel providing a vacuum chamber of a nuclear fusion apparatus, at least one cryopanel is arranged inside the vessel to be cooled to a low operating temperature, for condensing particles to exhaust them from the vacuum chamber. A main cooling circuit for cooling the cryopanel to the operating temperature is provided, and a liquid nitrogen holding tank is located inside the vacuum vessel and arranged to effect the pre-cooling of the cryopanel towards the operating temperature. In this way, liquid nitrogen which is required for other purposes in the fusion apparatus, is used to provide pre-cooling of the cryopanel.

In a vacuum vessel having at least one cryopanel inside the vessel and cooled to a low operating temperature, for condensing particles to be exhausted from the vacuum vessel, another aspect of the invention provides the improvement of a container within the vacuum vessel enclosing the cryopanel and having at least one inlet for access to the cryopanel of the particles to be exhausted, a shutter mounted within the container and movable to close the inlet, and means for moving the shutter within the container, to effect the closure of the inlet by the shutter. The closure of the container allows regeneration of the cryopanel. It is known to provide a shutter acting to close a cryopanel; however, the arrangement of the shutter inside the cryopanel container simplifies the construction and can improve the sealing of the container.

Where a plurality of the cryopanels are arranged respectively in a plurality of such containers, each said container has at least one such shutter to close an inlet thereof, so that the containers are independently closable by means of the shutters. This enables continuous evacuation of the vacuum vessel, by ensuring that at least one of the cryopanels is always connected to the vacuum vessel to exhaust it, while one or more other cryopanels is undergoing regeneration.

To improve cooling of at least a heat shield, the invention in another aspect provides a vacuum vessel having a member adapted to be cooled to a low operating temperature arranged inside the vessel, and a main cooling circuit for cooling the member to the operating temperature, the main cooling circuit having first fluid refrigerating means. The vessel has a heat shield for the cooled member, and a heat shield cooling circuit for cooling the heat shield, including a liquid nitrogen holding tank. There are provided means for maintaining the liquid nitrogen holding tank at sub-atmospheric pressure, whereby the temperature of liquid nitrogen in the liquid nitrogen holding tank is reduced below the boiling point of liquid nitrogen (77K).

Especially where a cryopanel of large height, for example, over 3 meters is used, it is advantageous for ease of operation and maintenance that a fluid refrigerating means and a compressor of a cooling circuit for cooling the cooled member in the vacuum vessel are arranged at a level below the middle in the height direction of the cooled member.

Whereas only one cryopanel may be sufficient to maintain a high vacuum state in the vacuum vessel, more than one cryopanel may be required to reach that high vacuum state. In yet another aspect, therefore, the invention provides a vacuum vessel having at least two members, for example, cryopanels, adapted to be cooled to a low operating temperature arranged inside the vessel, and at least two fluid refrigerating means arranged to supply cooled fluid to the members respectively. The two fluid refrigerating means are independently controllable so that the two members are independently operable.

BRIEF INTRODUCTION OF THE DRAWINGS

Embodiments of the present invention will now be described by way of non-limitative example, with reference to the accompanying drawings, in which.

DESCRIPTION OF THE PREFERRED EMBODIMENTS

Generally, in the accompanying drawings, the same reference numerals are used for the same or similar parts, whose description will not be fully repeated for each figure.

Figure 1:
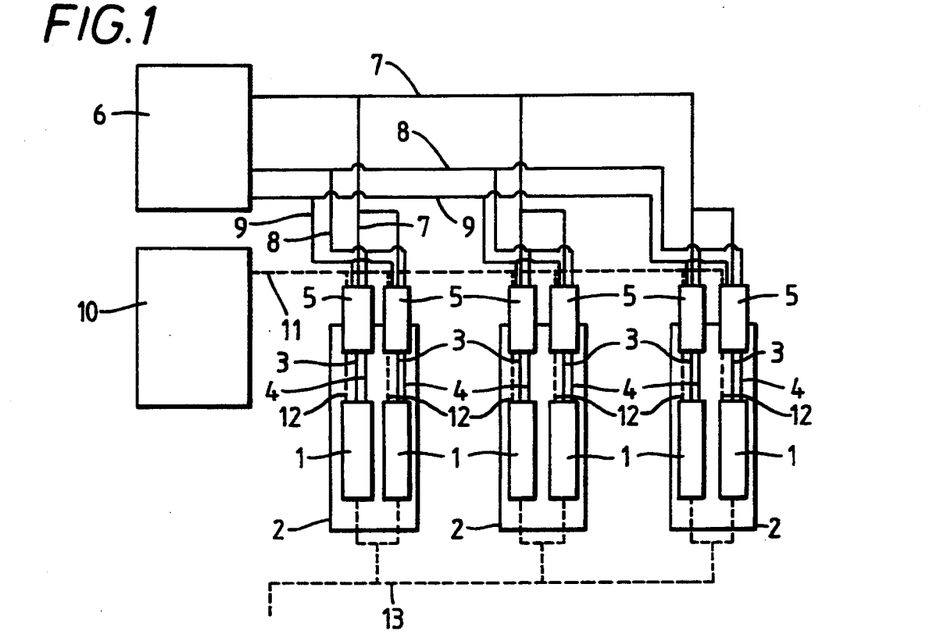
FIG. 1 is a diagram of a cryopumping system embodying the present invention.

A first embodiment of the present invention will be explained with reference to FIGS. 1 and 2.

Cryopumps 1 are disposed inside a vacuum vessel 2 which for example is part of a neutron beam injector device in a vacuum chamber of a nuclear fusion apparatus. Each cryopump 1 is connected to a small helium liquefaction refrigerator 5 through an ultra-low temperature helium feed piping 3 and an ultra-low temperature helium collection piping 4 within the vacuum vessel 2. High pressure helium gas at ambient temperature is supplied from a helium compressor 6 through a high pressure piping 7 to each helium liquefaction refrigerator 5, and medium and low pressure helium gas at ambient temperature after adiabatic expansion in the helium liquefaction refrigerator 5 is collected into the helium compressor 6 through a medium pressure piping 8 and a low pressure piping 9.

The two refrigerators 5 of each vessel 2 are independently controlled, so that either one or both cryopanels 1 can be operated, according to demand.

Liquid nitrogen for cooling a heat shield described below is supplied to the region of each refrigerator 5 from a liquid nitrogen tank 10 through a heat insulated piping 11, and is supplied to the heat shield plates of each cryopump 1 through a liquid nitrogen piping 12. The nitrogen gas evaporated inside the cryopump is emitted to atmosphere through piping 13.

Figure 2:
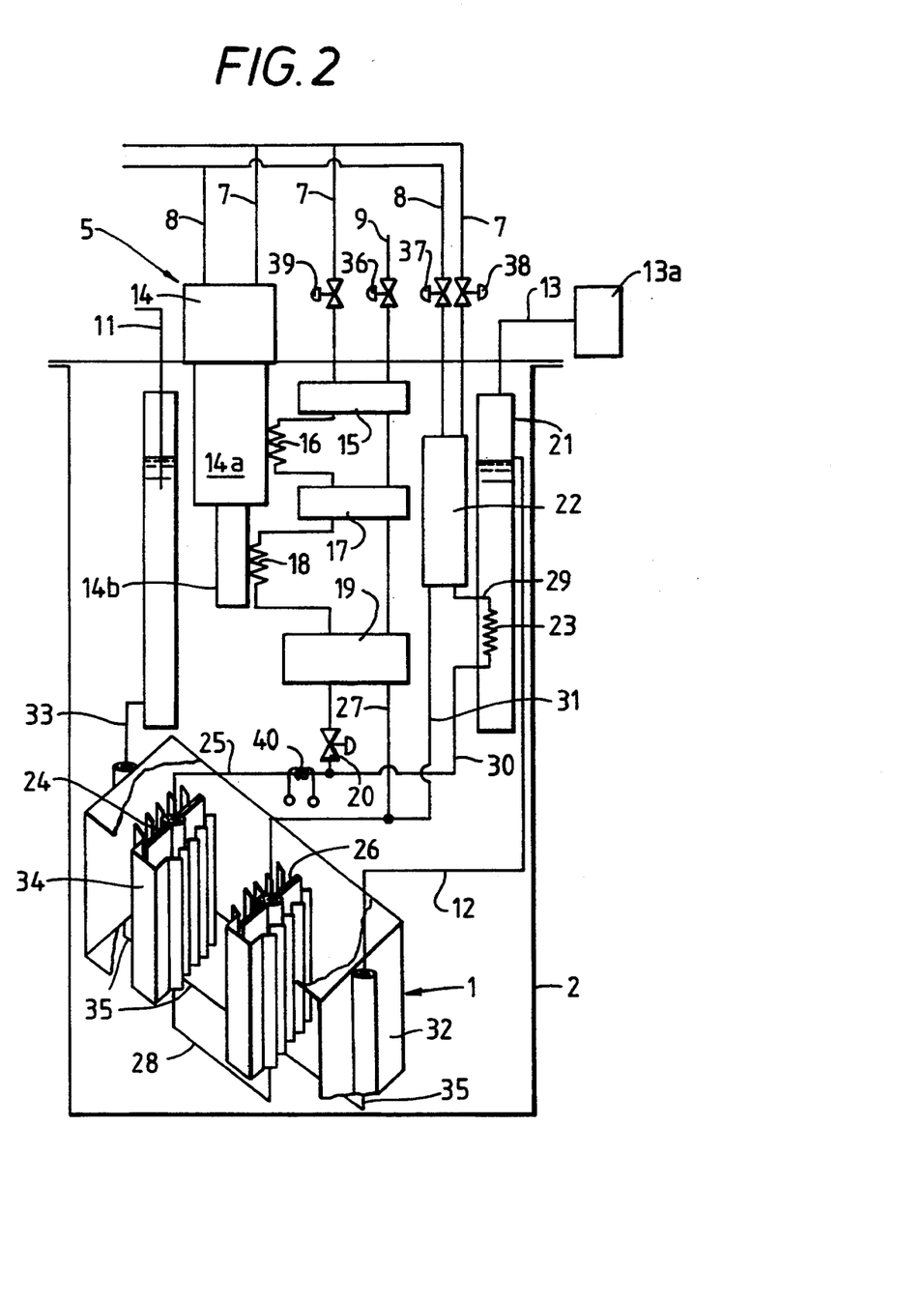
FIG. 2 is a diagrammatic view of a cryopanel arrangement and cooling means therefore, embodying the invention.

FIG. 2 shows the cooling system of the cryopanel assembly 1 to be cooled inside the vacuum vessel 2. Thus, FIG. 2 shows the parts 3, 4 and 5 of FIG. 1 in detail. The small helium liquefaction refrigerator 5 comprises a helium expander 14, in this case a Gifford-McMahon expander, and a Joule-Thomson circuit (hereinafter referred to as a "J.T. circuit") consisting of heat exchangers 15, 16, 17, 18, 19 and a Joule-Thomson valve 20 (hereinafter referred to as a "J.T. valve") in a main helium cooling circuit. A pre-cooling helium circuit includes heat exchangers 22, 23 and connects into the main cooling circuit. A liquid nitrogen vessel 21 is annular in cross-section and surrounds and thermally shields the helium expander 14 and a portion of the J.T. circuit and a portion of the pre-cooling circuit. The vessel 21 is part of a heat shield cooling circuit.

The two cryopanels 24, 26 for condensing gas to be exhausted at an ultra-low temperature and solidifying it, have cooling pipes within them connected to the outlet of the J.T. valve 20 by a high pressure piping 25, are connected to each other by piping 28 and to the heat exchanger 19 by a low pressure piping 27.

The heat exchangers 22 and 23 of the pre-cooling circuit are connected to each other by piping 29. The outlet of the heat exchanger 23, which is in the nitrogen tank 21, is connected to the outlet of the J.T. valve 20 by piping 30, and the low pressure piping 27 and the heat exchanger 22 are connected to each other by piping 31.

The lower part of the liquid nitrogen vessel 21 and a sheet-form heat shield 32 of the cryopump 1 are connected by piping 33, and the upper part of the liquid nitrogen vessel 21 and the heat shield 32 of the cryopump 1 are connected by piping 12. Louvers 34 surround the cryopanels 24, 26 and are connected into the heat shield cooling circuit by piping 35.

Next, the method of cooling the cryopump 1 will be explained.

Liquid nitrogen supplied from the liquid nitrogen tank 10 through the heat insulated piping 11 is introduced into the liquid nitrogen vessel 21, flows through pipings 33 and 35, and cools the heat shield plate 32 and louvers 34 to approximately 80K. The nitrogen gas evaporating inside the heat shield 32 and flowing through the piping 12, is led to the upper part of the liquid nitrogen vessel 21 and is emitted to the atmosphere through the piping 13.

The high pressure helium gas at ambient temperature is supplied from the helium compressor 6 into the heat exchanger 22 of the pre-cooling circuit through the high pressure piping 7 and is cooled to approximately 80K inside the heat exchanger 23 disposed in the liquid nitrogen vessel 21. The low-temperature high-pressure helium gas is supplied to the cryopanel 24 through the pipings 30 and 25, and rapidly cools the cryopanel.

The low-temperature high-pressure helium gas, after cooling the panels 24, 26, partly flows through the piping 27 through the heat exchangers 19, 17, 15 to return it to ambient temperature and pre-cools these heat exchangers. The remaining high pressure helium gas passes through the piping 31, and effects heat-exchange with the incoming high-pressure helium gas in the heat exchanger 22 to cool this high-pressure helium gas.

The flow rates of the low-temperature high-pressure helium gas supplied to both of the heat exchangers 19, 22 are regulated by a valve 36 at ambient temperature in the low pressure piping 9 and by a valve 37 at ambient temperature in a medium pressure piping 8. At this time, the ambient temperature high-pressure helium gas is supplied to the helium expander 14 from the helium compressor 6 through the high pressure piping 7 and is adiabatically expanded inside the helium expander to generate coldness of about 50K at a first stage 14a and coldness of about 10K at a second stage 14b.

After the cryopanel is cooled to about 80K, the valve 38 at ambient temperature in the high pressure piping 7 is closed; the valve 37 is slightly opened; the valve 39 in the high pressure piping 7 is opened; and the valve 36 in the low pressure piping 9 is fully opened.

The high pressure helium gas flowing from the valve 39 at ambient temperature into the J.T. circuit passes through the heat exchangers 15, 16, 17, 18, 19 and is then supplied to the cryopanel 24 through the J.T. valve 20 and the piping 25, cooling this cryopanel 24 down to about 10K. Thereafter, the low-temperature low-pressure helium gas flows through the pipings 27, 31 and the heat exchanger 22, and is discharged into the medium pressure piping 8.

Thereafter, the valve 37 is closed. After passing through the heat exchanger 19, the high pressure helium gas adiabatically expands in the J.T. valve 20 and is partially liquefied to provide liquid helium at 3.7K. The low pressure gas at 3.7K and liquid helium are supplied through the piping 25 to the cryopanel 24 and cooling the panel 24. At this time the liquid helium evaporates.

Thereafter, the ultra low-temperature low-pressure helium gas passes through the piping 27, changes to ambient temperature low-pressure helium gas while cooling the high pressure helium gas inside the heat exchangers 19, 17, 15, and the ambient temperature low-pressure helium gas flows into the low pressure piping 9 through the valve 36.

During the operation in which the cryopanel is heated for regenerating the cryopump and the gas to be exhausted, which is solidified on the cryopanel surface, is released, the low pressure gas downstream of the J.T. valve is heated to a predetermined temperature by a heater 40 on the piping 25, and the cryopanel is heated to about 10K.

After the gas to be exhausted is released, the heating by the heater 40 is stopped, and the cryopanel is cooled to 3.7K in the same way as in the cooling operation. The material of the cryopanel is aluminum, stainless steel, copper, or the like and its specific heat is extremely small at temperatures below 10K. Therefore, cooling from 10K to 3.7K is completed within a short time.

As described above, in this embodiment, each cryopump 1 is pre-cooled by liquid nitrogen used for cooling the heat shield 32 and can be then cooled to a predetermined ultra-low temperature by the small helium liquefaction refrigerator 5. Therefore, it is not necessary to cool and heat the vacuum heat insulated pipings during cooling and heating of the cryopanel, and the cooling and the heating of the cryopanel can be achieved within a short time.

In this embodiment, long vacuum heat insulated piping for transporting liquid helium is not necessary. Therefore liquid helium needs to be produced and supplied only for cooling the cryopanel, and electric energy for producing liquid helium can be reduced greatly compared with the prior art.

Furthermore, since vacuum heat insulated piping is not necessary, troubles resulting from such pipings such as vacuum leakage do not occur. Since only the J.T. valve must be operated at low temperature the reliability of the cooling system can be improved. In addition, since an expensive large liquid helium liquefaction apparatus is not necessary, the cost of the cooling system can be reduced.

The coldness of the helium expander is not used for cooling the heat shield of the cryopump. Therefore, the small helium liquefaction refrigerator can be cooled to a lower temperature, liquefaction of a greater quantity of the helium gas can be made, the refrigeration quantity of 3.7K gas can be increased and the cooling time of the cryopanel can be further reduced.

Furthermore, if a vacuum pump 13a is disposed on the downstream side of the piping 13 the liquid nitrogen can be cooled by evaporation to below 77K, and the temperatures of the heat shield plate 32 and louver 34 are lowered to about 70K. The quantity of radiation heat entering the cryopanel of 3.7K from the heat shield 32 and the louvers 34 can be reduced to about 1/1.7 in comparison with the case where the heat shield and the louvers are at 80K. Accordingly, the quantity of liquid helium which must be produced by the small helium liquefaction refrigerator can be reduced, and the electric energy for operation of the small helium liquefaction refrigerator can further be reduced.

Figure 3:
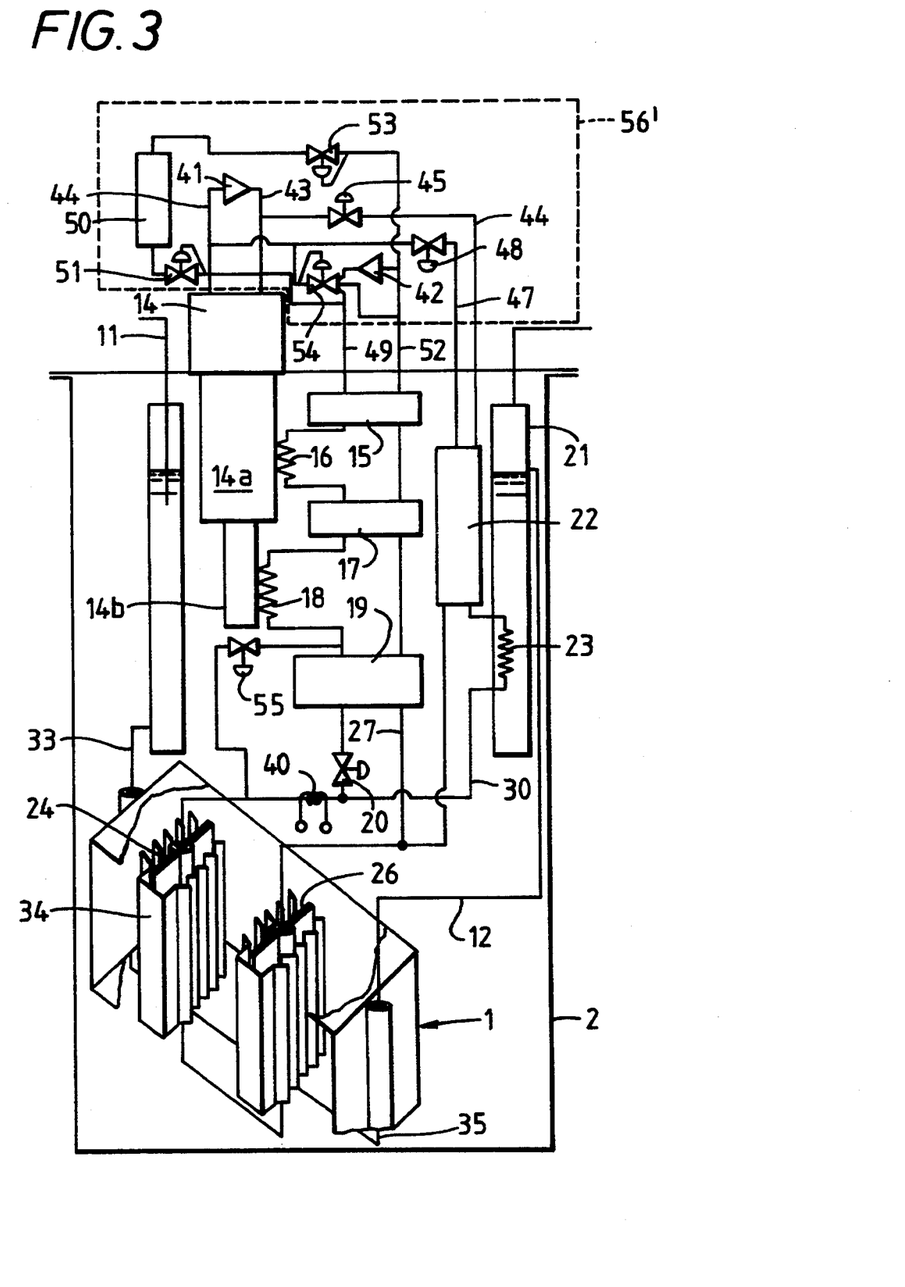
FIG. 3 is a diagrammatic view of a further cryopanel assembly and cooling circuits therefor, embodying the invention.

Another embodiment according to the present invention is shown in FIG. 3. Within the vacuum vessel 2, the structure of this embodiment is mainly identical to that of FIG. 2. Outside the vessel 2, in this embodiment, instead of the supply from the common helium compressor 6 of FIGS. 1 and 2, high pressure helium gas is supplied for each cryopump 1 from a helium compressor 41 arranged in the proximity of the cryopump. This compressor 41 is connected to the helium expander 14 by a pipe 43, and the medium-pressure helium gas after expansion is returned to the compressor 41 by a pipe 44.

High pressure gas for the main cooling circuit (J.T. circuit) is supplied from a helium compressor 42 arranged in the proximity of each cryopump to the heat exchanger 15 by a pipe 49, and low pressure helium gas after expansion in this circuit is returned to the compressor 42 via a pipe 52.

The high pressure pipe 43 from the helium compressor 41 and a high pressure pipe 44 of the pre-cooling circuit are connected to each other through a flow rate regulating valve 45. The medium pressure pipe 44 of the helium compressor 41 and the medium pressure piping 47 of the pre-cooling circuit are connected to each other through a flow rate regulating valve 48.

High pressure piping 49 from the helium compressor 42 and an excess gas storage tank 50 are connected to each other through a flow rate regulating valve 51. Low pressure pipe 52 of the helium compressor 42 and the excess gas storage tank 50 are connected to each other through a flow rate regulating valve 53.

Medium pressure pipe 44 of the helium compressor 41 and the low pressure pipe 52 of the helium compressor 42 are connected to each other through a flow rate regulating valve 54.

The method of cooling the cryopump 1 in this embodiment will now be explained.

Liquid nitrogen supplied from the liquid nitrogen tank 10 through the heat insulating piping 11 is introduced into the liquid nitrogen vessel 21 and cools the heat shield 32 and the louvers 34 to a temperature of about 80K through the pipings 33 and 35. The nitrogen gas evaporating inside the heat shield plate 32 is guided to the upper part of the liquid nitrogen vessel 21 by the piping 12 and is emitted to the atmosphere through the piping 13.

The ambient temperature high-pressure helium gas is supplied from the helium compressor 41 which has a capacity about ten times that of the helium compressor 42 to the heat exchanger 22 of the pre-cooling circuit through the high pressure pipe 43 and the valve 45, and this high pressure helium gas is cooled to a temperature of about 80K inside the heat exchanger 23 in the liquid nitrogen vessel 21. The low-temperature high-pressure helium gas is supplied to the cryopanels 24 through the pipings 30 and 25 and rapidly cools it.

The low-temperature high-pressure helium gas after cooling the cryopanels returns to the pipings 27 and 31. Part of it passes through the ambient temperature heat exchangers 19, 17, 15 and cools them. The other part of the high pressure helium gas passes through the piping 31 and effects heat-exchange with the incoming ambient temperature high-pressure helium gas in the pre-cooling circuit in the heat exchanger 22.

The flow rates of the low-temperature high-pressure helium gas to the two heat exchangers 19, 22 are regulated by the valve 54 and by the valve 48.

During this pre-cooling phase, the helium compressor 41 supplies the ambient temperature high-pressure helium gas to the helium expander 14 through the high pressure pipe 43. The helium is adiabatically expanded inside the helium expander and generates coldness of about 50K at the first stage 14a and coldness of about 10K at the second stage 14b.

After the cryopanels 24 are cooled to about 80K, the valves 45 and 48 are closed.

Next, the ambient temperature high-pressure helium gas is supplied from the helium compressor 42 to the main cooling circuit (J.T. circuit) through the high pressure piping 49 and is cooled while passing through the heat exchangers 15, 16, 17 and 18. The helium gas is then supplied to the cryopanel 24 through a pre-cooling valve 55 by-passing the heat exchanger 19 and the J.T. valve 20, and cools the cryopanels to about 10K.

Thereafter, the low-temperature low-pressure helium gas passes via the piping 27 and cools the high pressure helium gas in the heat exchangers 17, 15 and then flows into the low pressure piping 52 and returns to the helium compressor 42.

Then, the pre-cooling valve 55 is closed. The high pressure helium gas now passes through the heat exchanger 19, and is adiabatically expanded in the J.T. valve 20 to provide liquid helium of a temperature of 3.7K since part of the gas is liquefied. The low pressure gas of 3.7K and liquid helium pass through the piping 25 to the cryopanels 24, and cool them while the liquid helium evaporates.

Then, the ultra low-temperature low-pressure helium gas passes through the piping 27, cools the high pressure helium gas in the heat exchangers 19, 17, 15, flows into the low pressure piping 52 and returns to the helium compressor 42.

The circulating helium from the helium compressor 41 is regulated to an appropriate flow rate by the valve 54, and the quantity of the helium gas inside the excess gas storage tank 50 is increased or decreased by the valves 51, 53 so as to suitably regulate the flow rate of circulating helium from the helium compressor 42.

During the operation in which the cryopanel 24 is heated and the gas to be exhausted, which is solidified on the cryopanel surface, is released in order to regenerate the cryopanel, the low pressure helium gas downstream of the J.T. valve is heated to a predetermined temperature by the heater 40 disposed in the piping 25, and the cryopanel is heated to about 10K.

After the gas to be exhausted has been released from the cryopanels 24, the heating by the heater 40 is stopped and the cryopanel is cooled to 3.7K in the same way as in the cooling operation. The material of the cryopanel is aluminum, stainless steel, copper, or the like. Since its specific heat is extremely small at temperatures below 10K, the cooling from 10K to 3.7K can be finished within a short time.

In the embodiment of FIG. 3, the cryopump 1 can be pre-cooled by supplying large quantities of the helium gas of ambient temperature from the helium compressor 41 having a processing capacity about ten times that of the helium compressor 42, through the high pressure piping 43, 44 to the heat exchanger 23 of the pre-cooling, circuit, where it is cooled by means of coldness of part of the liquid nitrogen used for cooling the heat shield. Subsequently, the cryopump 1 is cooled to a predetermined ultra-low temperature by the small helium liquefaction refrigerators including the main cooling circuit (J.T. circuit) by means of the helium gas from the helium compressor 42. Accordingly, it is not necessary to cool and heat, long vacuum heat insulated pipings when the cryopanel is cooled and heated, and the cooling and the heating of the cryopanel can be finished within a short time. All of the control valves are outside the vacuum chamber and at ambient temperature except the by-pass valve 55.

In this embodiment, the helium compressor for each cryopump is disposed near each cryopump. Therefore, the low pressure piping 52 of the main cooling circuit, in particular, can be shortened and the pressure loss of the low pressure helium gas can be minimized. Also, the power of the helium compressor 42 for obtaining the predetermined saturation pressure temperature 3.7K of the low pressure helium at the outlet of the J.T. valve can be reduced. Consequently, the power consumption can further be reduced.

Figure 4:
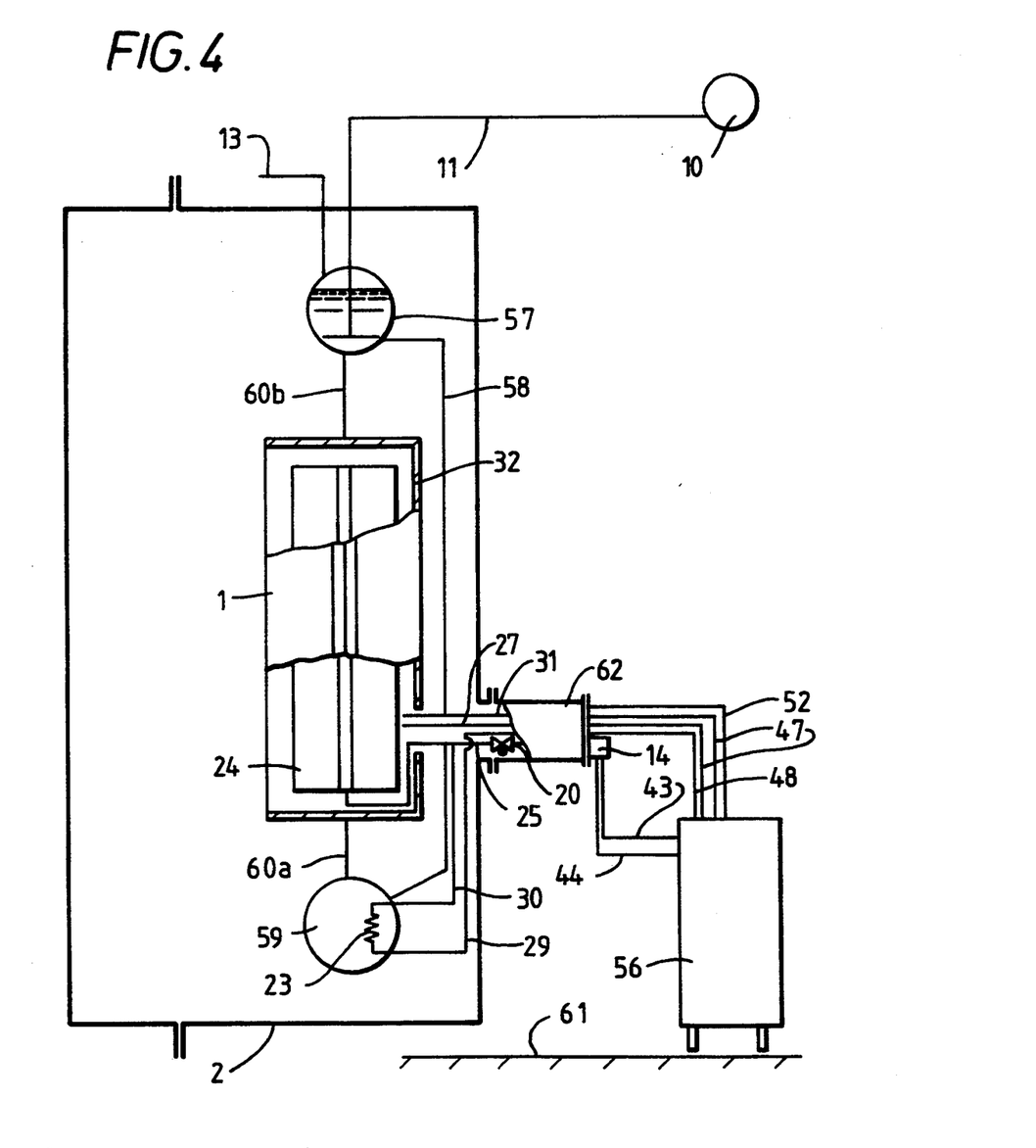
FIG. 4 is a partly diagrammatic side view of a further cryopanel assembly and parts of cooling circuits therefor, embodying the invention.

FIG. 4 shows another embodiment of the present invention, which is in effect a modified structure arrangement of the embodiment of FIG. 3. The parts surrounded by the broken line 56' of FIG. 3 are all housed in a vessel 56, example helium compressors 41, 42, excess gas storage tank 50 and the several flow rate regulating valves. The vessel 56 is located on a floor 61 at the level of the lower part of the vacuum vessel 2 and near the cryopump.

Liquid nitrogen is delivered into an upper liquid nitrogen tank 57 disposed in the upper part of the vacuum vessel 2 and circulates to a lower liquid nitrogen tank 59 through a piping 58. From there, liquid nitrogen passes up through piping 60a, cools the heat shield plate 32, then passes through piping 60b and returns to the upper liquid nitrogen tank 57.

In this embodiment, the small helium refrigerator 14 and the heat exchangers of the main cooling and pre-cooling circuits are disposed at a low level in the vacuum vessel 2, in particular mainly in a projecting housing portion 62 of the vacuum tank 2. Therefore, the maintenance and inspection of these apparatuses can be made easily from the floor 61 where the vacuum vessel is installed. The housing portion 62 and the vessel 56 are both below the mid-height level of the vacuum vessel 2.

Figure 5:
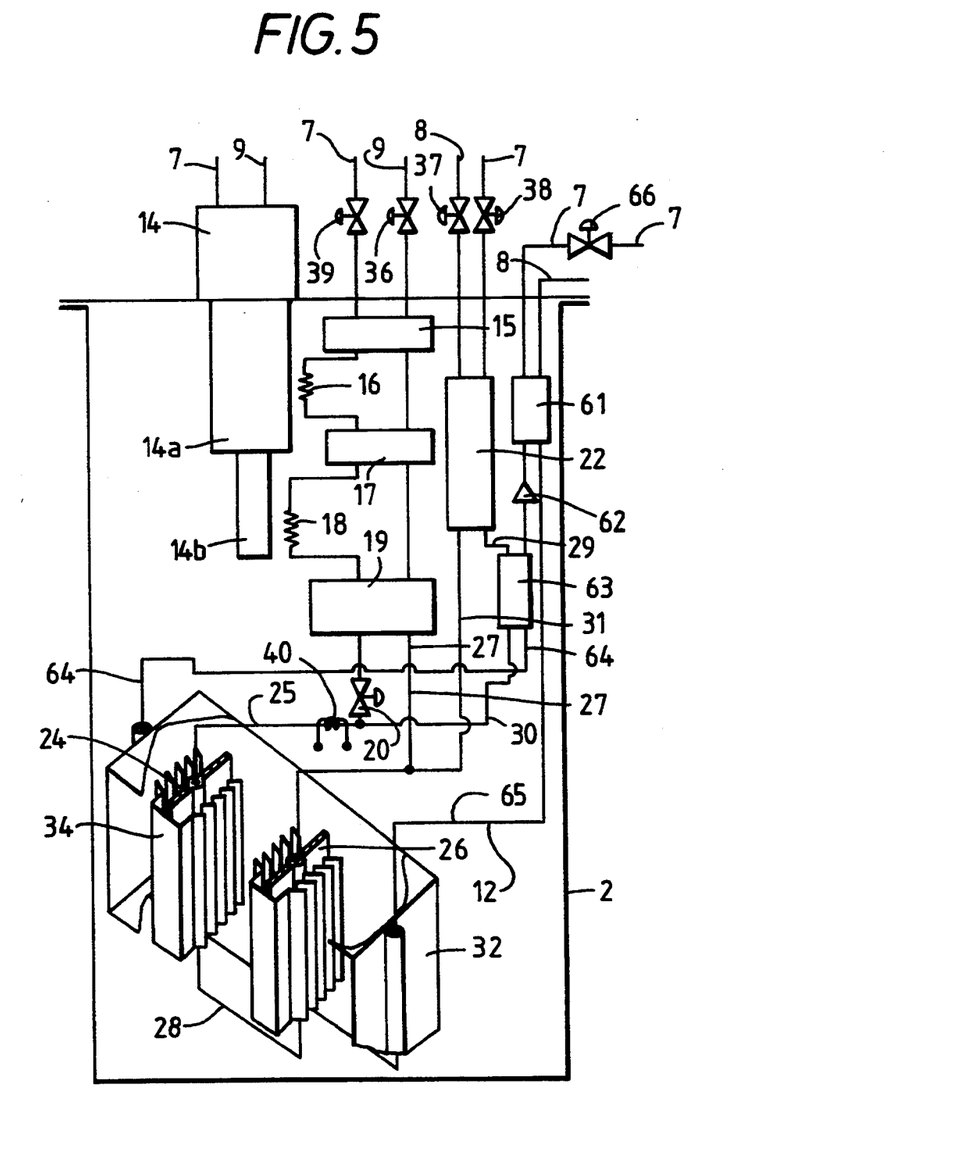
FIG. 5 is a diagrammatic view of yet another cryopanel assembly and cooling circuits therefor, embodying the present invention.

FIG. 5 shows still another embodiment of the present invention.

In this embodiment, a small helium circuit of an intermediate temperature for cooling the heat shield 32 replaces the liquid nitrogen heat shield cooling circuit of FIG. 2. The helium lines 7, 8, 9 of FIG. 5 are connected to a helium compressor 6 in the manner shown in FIG. 1.

The small helium circuit for cooling the heat shield 32 comprises a heat exchanger 61, a helium expander 62 and a heat exchanger 63. The heat exchanger 63 has the function of the heat exchanger 23 of the pre-cooling circuit shown in FIG. 1, for example, to provide cooling of the helium flowing in the pre-cooling circuit via valves 38 and 37.

High pressure helium gas is supplied to the helium circuit for cooling the heat shield 32 from the helium compressor 6 via piping 7 and through a flow rate regulating valve 66. This high pressure helium gas flows into the heat exchanger 61 and is cooled in it and then flows into the helium expander 62 such as a turbine type expander and is adiabatically expanded to provide coldness of about 50K.

The medium-pressure low-temperature helium gas of 50K after expansion flows into the heat exchanger 63 and cools the heat exchanger and flows through the piping 64 and cools the heat shield 32 and louvers 34 to a temperature of about 60K. The medium-pressure low-temperature helium gas whose temperature somewhat rises inside the heat shield 32 passes through a piping 65 and flows into the heat exchanger 61 and cools the heat exchanger and is converted to ambient temperature medium-pressure helium gas and is collected by the medium pressure piping 8.

In the pre-cooling circuit, ambient temperature high-pressure helium gas is supplied from the helium compressor 6 to the heat exchanger 63 of the pre-cooling circuit through the valve 38 and heat exchanger 22 and is cooled to about 60K inside the heat exchanger 63, from where it passes to the cryopanels 24 through pipings 30 and 25 and rapidly cools them to 60K.

The low temperature high pressure helium gas after cooling the panels 24 passes partly through piping 27 and through heat exchangers 19, 17, 15 and pre-cools these heat exchangers. The remaining high pressure helium gas passes through the piping 31 and effects heat exchange with the incoming normal-temperature high-pressure helium gas inside the heat exchanger 22 to cool it. During this stage, the flow rates of the high-pressure helium gas supplied to both of the heat exchangers 19, 63 are regulated by the valve 36 and the valve 37.

After the cryopanel is cooled to about 60K, the valve 38 is closed; the valve 37 is slightly opened; the valve 39 is opened, and valve 36 is fully opened. The refrigerator 14 is operated. The ambient temperature high-pressure helium gas flowing from the valve 39 into the J.T. circuit passes through the heat exchangers 15, 16, 17, 18, 19, then passes through a J.T. valve 20 and the piping 25 and is supplied to the cryopanel 24 and cools it to about 10K. The low-temperature low-pressure helium gas passes through the piping 31 and the heat exchanger 22 and is discharged into the piping 8.

Thereafter, the valve 37 is closed. The high pressure helium gas passes through the heat exchanger 19, and is then expanded adiabatically in the J.T. valve 20 and is partly liquefied to produce liquid helium having a temperature of 3.7K. The low pressure gas of 3.7K and liquid helium pass through the piping 25 and are supplied to the cryopanel 24. As they cool the cryopanel 24, the liquid helium evaporates. The ultralow-temperature low-pressure helium gas passes through the piping 27 and converts to ambient temperature low-pressure helium gas while cooling the incoming helium gas inside the heat exchangers 19, 17, 15, and flows into the low pressure piping 9 through the valve 36.

In this embodiment, the heat insulated piping for transferring liquid nitrogen is unnecessary. Therefore, there is no need to cool such heat insulated piping and the cooling time of the cryopump can further be reduced. Since the heat shield and the louvers can be cooled to 60K, the radiation heat quantity entering the 3.7K cryopanel from the heat shield and the louvers can be reduced by ⅓ of the case where the heat shield and the louvers are at 80K. Accordingly, the amount of liquid helium produced in the main helium cooling circuit can be reduced, and the electric power required can be further reduced.

The illustrated embodiments employ the Gifford-McMahon refrigerator as the coldness generation means in the main cooling circuit, but the same effect can be achieved when this coldness generation means is any other suitable refrigerator such as a Solbey refrigerator, a Vuilleumier refrigerator, a pulse-tube refrigerator, a turbine refrigerator, a Stirling refrigerator, a Claude refrigerator, or a reciprocating refrigerator having a valve at a low temperature portion.

Likewise, the J.T. valve 20 is employed as a second coldness generation means, in the main cooling circuit, but the same effects can be produced when this second coldness generation means is another suitable device such as a turbine expander, a Stirling expander, or a reciprocating expander having a valve at a lower temperature portion.

In the heat shield cooling circuit, liquid nitrogen or the helium turbine expander 62 are used as the coldness sources. The same effects arise when this coldness source is for example, a Stirling expander, a reciprocating expander having a valve at a low temperature portion or an expansion valve operating at 80K or above.

To summarize the advantages of these embodiments, each of a plurality of cryopumps disposed in a vacuum vessel, for example, a neutron beam injector of a nuclear fusion reactor, is cooled by a small liquid helium liquefaction refrigerator. Heat insulated piping for transferring liquid helium is not arranged in an ambient temperature portion, so that the loss of liquid helium in a heat insulated pipe can be minimized. The cryopanel can be cooled from normal temperature by utilizing coldness of the liquid nitrogen used for cooling a heat shield. Therefore, cooling and heating of the cryopanel can be made within a short time. The pre-cooling circuit also accelerates the cooling process.

Since helium gas used as the medium generating low temperature in the liquefaction refrigerator is supplied and collected by ambient temperature piping, it is not necessary to use vacuum heat-insulated piping. Accordingly, heat loss does not occur. Since the normal temperature piping, with all or most valves at ambient temperature, has higher operational reliability than vacuum heat insulated piping, the reliability of the cooling system is improved.

Figure 6:
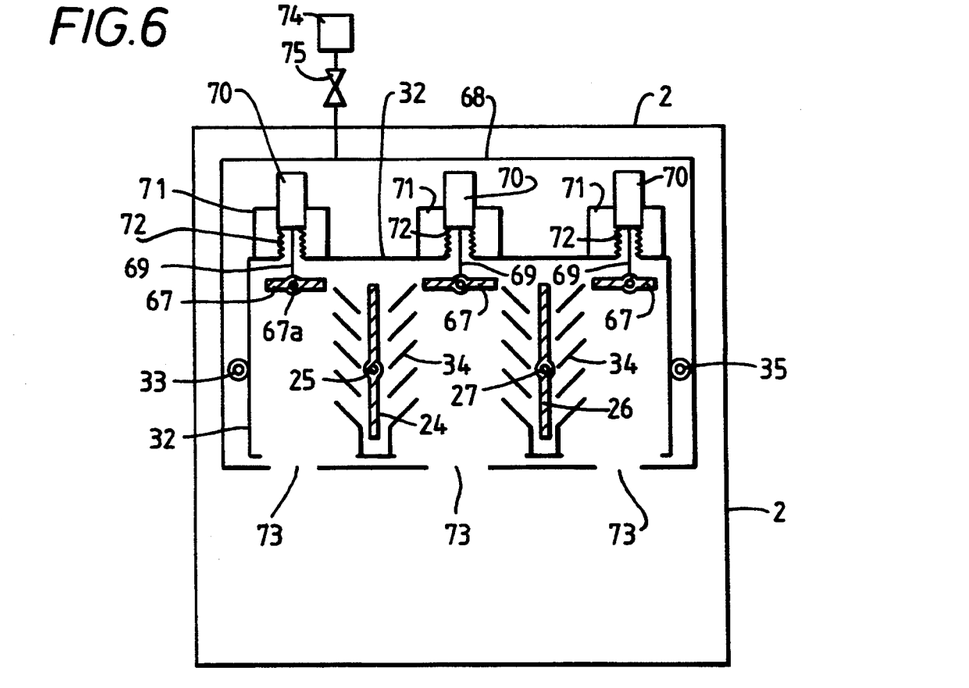
FIG. 6 is a partly diagrammatic horizontal section of a vacuum vessel containing cryopanels, embodying the present invention.

FIG. 6 discloses another aspect of the design and operation of the cryopanels illustrated above. FIG. 6 shows in horizontal section a vacuum vessel 2 containing two vertical cryopanels 24, 26 having cooling pipes 25, 27 within them and having louver structures 34 on both sides of each of them, in a known manner. The two cryopanels 24, 26 are mounted within a container 68 which in this embodiment is separated from the wall of the vessel 2. This container 68 has three inlets 73, each of substantially the same height as the cryopanels 24, 26, for access of particles to be condensed by the cryopanels, so that the cryopanels can act as a cryopump to exhaust the vacuum vessel 2. The cooled heat shield 32 with inlet and outlet cooling pipes 33, 35 is shown also within the container 68.

In order to close each inlet 73, there are mounted within the chamber 68 three shutters 67, also having cooling fluid conduits 67a within them, and carried by rods 69. There are two such rods 69 for each shutter 67, vertically spaced. Each rod 69 is horizontally movable by suitable drive means 70, which may be an air piston and cylinder or a mechanical drive motor, carried on the heat shield 32 by bellows 72 and brackets 71.

The drive means 70 are effective to move the rods 69 so as to move the shutters 67 horizontally across the container 68 to close the respective inlets 73. The shutters are larger than the inlets 73 so that they seal to the edges of the inlet.

After this sealing takes place, the cryopanels 24, 26 are heated or allowed to rise in temperature, so that the particles condensed on them are evaporated and can be extracted from the now closed container 68 by a pump 74 through a valve 75. The rise in pressure inside the container 68 during this operation enhances the sealing of the shutters 67 around the inlets 73, since the vacuum vessel 2 remains under vacuum.

The vacuum vessel 2 preferably has a plurality of cryopanel arrangements as illustrated by FIG. 6, in separate containers 68. Each container 68 can be independently closed by means of the shutters 67 in them. This permits the cryopanel assemblies to be independently regenerated, so that they may be regenerated in sequence ensuring that at least one cryopanel assembly is operational to exhaust the vacuum vessel 2 at all times.

Another advantage of the arrangement of FIG. 6 is that the cryopanels can be regenerated without disturbing the pressure in the vacuum chamber 2, as a result of the evaporation of the gases from the heated cryopanel. The cryopanels can be heated to the minimum temperature necessary to evaporate the condensed particles, so that the heating and recooling of the cryopanel can be achieved within a short time, and consequently only a small refrigerator is needed to maintain the low temperature of the cryopanel.

Though this invention has been illustrated here for the case where cryopanels are the members to be cooled, the same effects are obtained when the member to be cooled is for example a superconductive magnet or a component of electronics manufacturing equipment, for example, plasma generating equipment.

What is claimed is:

1. A vacuum vessel comprising:
   means for exhausting gas from said vacuum vessel to provide a vacuum within said vessel,
   a member adapted to be cooled to a low operating temperature arranged inside said vacuum vessel,
   a main cooling circuit using fluid to cool said member to said low operating temperature, said main cooling circuit having first fluid refrigerating means disposed within said vacuum vessel for cooling said fluid, and
   a pre-cooling circuit having second fluid refrigerating means disposed within said vacuum vessel for cooling said fluid and operating independently of said first fluid refrigerating means.

2. A vacuum vessel according to claim 1, wherein said pre-cooling circuit is arranged to cool said main cooling circuit, prior to an operation of said main cooling circuit.

3. A vacuum vessel according to claim 2, wherein said main cooling circuit and said pre-cooling circuit are connected, for a passage of the fluid from said pre-cooling circuit into said main cooling circuit to pre-cool said main cooling circuit.

4. A vacuum vessel according to claim 1, further comprising:
   a heat shield for shielding said member from heat, and
   a heat shield cooling circuit for cooling said heat shield, said heat shield cooling circuit including said second fluid refrigerating means of said pre-cooling circuit, whereby cooling fluid in said heat shield cooling circuit cools the fluid of said pre-cooling circuit.

5. A vacuum vessel according to claim 4, wherein said second fluid refrigerating means comprises a heat exchanger between said pre-cooling circuit and said heat shield cooling circuit.

6. A vacuum vessel according to claim 4, wherein said heat shield cooling circuit is a liquid nitrogen cooling circuit.

7. A vacuum vessel according to claim 4, wherein said heat shield cooling circuit comprises a gaseous fluid expansion device for cooling the fluid.

8. A vacuum vessel according to claim 1, wherein said vacuum vessel further comprises at least one control valve for said main cooling circuit, arranged at a location in said main cooling circuit at an ambient temperature during an operation of said main cooling circuit.

9. A vacuum vessel according to claim 1, wherein said vacuum vessel further comprises at least one control valve for said pre-cooling circuit, arranged at a location in said pre-cooling circuit an ambient temperature during an operation of said pre-cooling circuit.

10. A vacuum vessel according to claim 1, wherein said main cooling circuit comprises heating means for heating the fluid in said main cooling circuit to heat said member.

11. A vacuum vessel according to claim 1, wherein said member is a cryopanel for condensing gas to be exhausted from said vacuum vessel.

12. A vacuum vessel according to claim 1, wherein said member comprises a superconductor.

13. A vacuum vessel comprising:
    means for exhausting gas from said vacuum vessel to provide a vacuum within said vessel,
    a member adapted to be cooled to a low operating temperature and arranged inside said vacuum vessel,
    a main circuit for cooling a first fluid to cool said member to said low operating temperature, said main circuit having first fluid refrigerating means arranged inside said vacuum vessel to cool said first fluid,
    a pre-cooling circuit for cooling a second fluid to pre-cool said member towards low operating temperature,
    a heat shield for shielding said member from heat, and
    a heat shield cooling circuit using a cooled fluid to cool said heat shield,
    wherein said heat shield cooling circuit has a vessel, and wherein said vessel, while operating, encloses the cooled fluid and is located inside the vacuum vessel and surrounds a portion of said main cooling circuit and a portion of said pre-cooling circuit so as to provide cooling thereof.

14. A vacuum vessel forming a vacuum chamber of a nuclear fusion apparatus, comprising:
    means for exhausting gas from said vacuum vessel to provide a vacuum within said vessel,
    at least one cryopanel arranged inside said vacuum vessel and adapted to be cooled to a low operating temperature for condensing particles to be exhausted from said vacuum chamber,
    a cooling circuit for cooling fluid to cool said cryopanel to said low operating temperature, and
    a liquid nitrogen holding tank located inside said vacuum vessel and arranged to pre-cool said cryopanel towards said low operating temperature.

15. A vacuum vessel comprising:
    means for exhausting gas from said vacuum vessel to provide a vacuum within said vessel,
    at least one cryopanel arranged inside said vacuum vessel and adapted to be cooled to a low operating temperature for condensing particles to be exhausted from said vacuum vessel, means for cooling said at least one cryopanel, a container within said vacuum vessel and enclosing said cryopanel, said container having at least one inlet to access said particles to be exhausted, a shutter mounted within said container and movable to close said at least one inlet, said shutter having cooling means incorporated therein for cooling said shutter, and means for moving said shutter within said container to close said at least one inlet by said shutter.

16. A vacuum vessel according to claim 15, wherein said vacuum vessel further comprises a plurality of cryopanels arranged respectively in a plurality of containers, each of said containers having at least one shutter to close an inlet thereof, whereby said containers are independently closable by said at least one shutter.

17. A vacuum vessel comprising:

means for exhausting gas from said vacuum vessel to provide a vacuum within said vessel, a member adapted to be cooled to a low operating temperature arranged inside said vacuum vessel, a cooling circuit using fluid to cool said member to said low operating temperature, said cooling circuit having first fluid refrigerating means to cool the fluid, a heat shield for shielding said member from heat, a heat shield cooling circuit for cooling said heat shield, including a liquid nitrogen holding tank, and means for maintaining said liquid nitrogen holding tank at a sub-atmospheric pressure, whereby a temperature of liquid nitrogen in said liquid nitrogen holding tank is reduced below the boiling point of the liquid nitrogen.

* * * * *